US010756992B2

(12) United States Patent
Simitsis et al.

(10) Patent No.: US 10,756,992 B2
(45) Date of Patent: Aug. 25, 2020

(54) DISPLAY OF NETWORK ACTIVITY DATA

(71) Applicant: EntIT Software LLC, Sunnyvale, CA (US)

(72) Inventors: Alkiviadis Simitsis, Santa Clara, CA (US); Martin Arlitt, Calgary (CA)

(73) Assignee: MICRO FOCUS LLC, Santa Clara, CA (US)

( * ) Notice: Subject to any disclaimer, the term of this patent is extended or adjusted under 35 U.S.C. 154(b) by 357 days.

(21) Appl. No.: 15/841,124

(22) Filed: Dec. 13, 2017

(65) Prior Publication Data

US 2019/0182130 A1 Jun. 13, 2019

(51) Int. Cl.
G06F 15/173 (2006.01)
H04L 12/26 (2006.01)
H04L 12/24 (2006.01)
G06T 15/00 (2011.01)
H04L 29/12 (2006.01)

(52) U.S. Cl.
CPC ............ *H04L 43/045* (2013.01); *G06T 15/00* (2013.01); *H04L 41/14* (2013.01); *H04L 43/0876* (2013.01); *H04L 61/2007* (2013.01); *G06T 2215/16* (2013.01); *H04L 41/142* (2013.01)

(58) Field of Classification Search
CPC ... H04L 43/045; H04L 41/14; H04L 43/0876; H04L 61/2007; H04L 41/142; G06T 15/00; G06T 2215/16
USPC ........................................................ 709/224
See application file for complete search history.

(56) References Cited

U.S. PATENT DOCUMENTS

| 7,028,083 | B2 | 4/2006 | Levine et al. |
| 7,734,815 | B2 | 6/2010 | Leighton et al. |
| 7,764,625 | B2 | 7/2010 | Duffield et al. |
| 8,019,865 | B2 | 9/2011 | Chang et al. |
| 8,806,632 | B2 | 8/2014 | Stefanidakis et al. |
| 9,083,560 | B2 | 7/2015 | Lee et al. |
| 9,380,071 | B2 | 6/2016 | Liljenstam et al. |
| 9,426,029 | B2 | 8/2016 | Saavedra |
| 9,634,851 | B2 | 4/2017 | Haley et al. |
| 9,699,205 | B2 | 7/2017 | Muddu et al. |
| 10,127,908 | B1 | 11/2018 | Deller et al. |
| 2005/0210520 | A1 | 9/2005 | Horvitz et al. |
| 2005/0262057 | A1 | 11/2005 | Lesh et al. |

(Continued)

OTHER PUBLICATIONS

Brent Stewart, "CCNP TSHOOT 642-832 Quick Reference", Feb. 16, 2010, 69 pages. Ciscopress.com.

(Continued)

*Primary Examiner* — Atta Khan

(57) ABSTRACT

According to examples, an apparatus may include a processor and a memory on which is stored machine readable instructions executable by the processor to access network activity data collected over a time period associated with a plurality of network entities, in which each of the network entities is assigned a distinct internet protocol (IP) address including a network prefix set of bits and a network entity identifier set of bits. The instructions may also cause the processor to generate representations of the network activity data corresponding to the respective network entities and display the generated representations of the network activity data corresponding to the respective network entities on an IP address block map according to the network entity identifier set of bits of the respective network entities.

20 Claims, 12 Drawing Sheets

(56) References Cited

U.S. PATENT DOCUMENTS

| | | | |
|---|---|---|---|
| 2006/0291446 A1* | 12/2006 | Caldwell | H04L 45/42 370/351 |
| 2007/0019548 A1 | 1/2007 | Krishnamurthy | |
| 2007/0111771 A1 | 5/2007 | Ihori et al. | |
| 2009/0086651 A1 | 4/2009 | Luft et al. | |
| 2009/0248841 A1* | 10/2009 | Tjandra | H04L 61/6059 709/220 |
| 2012/0084531 A1 | 4/2012 | Funk et al. | |
| 2013/0222387 A1* | 8/2013 | Bradshaw | G06T 11/206 345/440 |
| 2013/0321458 A1 | 12/2013 | Miserendino et al. | |
| 2013/0326049 A1 | 12/2013 | Talton | |
| 2015/0199408 A1 | 7/2015 | Wulff et al. | |
| 2015/0350229 A1 | 12/2015 | Mitchell | |
| 2016/0140123 A1 | 5/2016 | Chang et al. | |
| 2016/0212172 A1 | 7/2016 | Senanayake et al. | |
| 2016/0308898 A1 | 10/2016 | Teeple et al. | |
| 2016/0328159 A1 | 11/2016 | Coddington et al. | |
| 2017/0118236 A1 | 4/2017 | Devi Reddy et al. | |
| 2017/0237760 A1 | 8/2017 | Holeman et al. | |

OTHER PUBLICATIONS

Varun Chandola et al., "Summarization—Compressing Data into an Informative Representation", Fifth IEEE International Conference on Data Mining, Nov. 27-30, 2005, Houston, TX, IEEE, 8 pages. https://pdfs.semanticscholar.org/4d05/2464408345de7913896042887309796756da.pdf.

Chandola, et al., "Summarization—Compressing Data Into an Informative Representation", Knowledge and Information Systems, vol. 12, No. 3, 2007, pp. 1-24.

Cormode, et al., "Synopses for Massive Data: Samples, Histograms, Wavelets, Sketches", Foundations and Trends in Databases, vol. 4, Nos. 1-3:1-294, 2012, 296 pages.

Ertoz, et al., "Detection and Summarization of Novel Network Attacks Using Data Mining", Minnesota INtrusion Detection System (MINDS) Technical Report, 2003, 20 pages.

Estan, et al., "Building a Better Netflow". SIGCOMM Computer Communication Review, vol. 34, No. 4, Aug. 2004, pp. 245-256.

Gilbert, et al., "QuickSAND: Quick Summary and Analysis of Network Data", DIMACS Technical Report, Nov. 2001, 25 pages.

Holz, et al., "The SSL Landscape: A Thorough Analysis of The X. 509 PKI Using Active and Passive Measurements", In Proceedings of the ACM SIGCOMM Conference on Internet Measurement Conference, Nov. 2011 pp. 427-444. ACM, 2011.

Kornexl, et al., "Building a Time Machine for Efficient Recording and Retrieval of High-Volume Network Traffic", In Proceedings of the 5th ACM SIGCOMM Conference on Internet Measurement, USENIX Association, 2005, pp. 267-272.

Najafabadi, et al., "Detection of SSH Brute Force Attacks Using Aggregated Netflow Data", In IEEE 14th International Conference on Machine Learning and Applications (ICMLA), Dec. 2015 pp. 283-288.

Sperotto, et al., "An Overview of IP Flow-Based Intrusion Detection", IEEE Communications Surveys and Tutorials, vol. 12, No. 3, Third Quarter 2010, pp. 343-356.

Wang, et al., "sFlow: Towards Resource-Efficient and Agile Service Federation in Service Overlay Networks", In Proceedings of IEEE 24th International Conference on Distributed Computing Systems, Mar. 2004, pp. 628-635.

Omar Santos, "Big Data Analytics and NetFlow", Oct. 19, 2015, pp. 3. http://www.ciscopress.com/articles/article.asp?p=2437424.

"IP Network Browsing with Network Performance Monitor", download date Sep. 1, 2017, pp. 6. http://www.solarwinds.com/topics/ip-network-browser.

"LANState—Network Mapper and Device Monitor", download date Aug. 21, 2017, pp. 5. http://www.10-strike.com/lanstate.

Josef Niedermeier, "Net Flow Data Processing using Hadoop and Vertica"Jun. 1, 2017, pp. 4. https://www.slideshare.net/JosefNiedermeier1/netflow-data-processing-using-hadoop-and-vertica.

Florian Mansmann, "Visual Analysis of Network Traffic-Interactive Monitoring, Detection, and Interpretation of Security Threats", Jun. 13, 2008, pp. 186. https://www.uni-konstanz.de/mmsp/pubsys/publishedFiles/Mansmann08.pdf.

* cited by examiner

DISPLAY OF NETWORK ACTIVITY DATA

BACKGROUND

Raw network activity data, such as NetFlow data, is a set of records that describes network traffic where each record may have different features pertaining to Internet Protocol (IP) addresses of network entities involved in network data exchange. The network activity data may have a large mix of categorical and continuous attributes. The volume of the network activity data may be extremely large, which often makes it unsuitable for visual representation on a screen of a display device.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
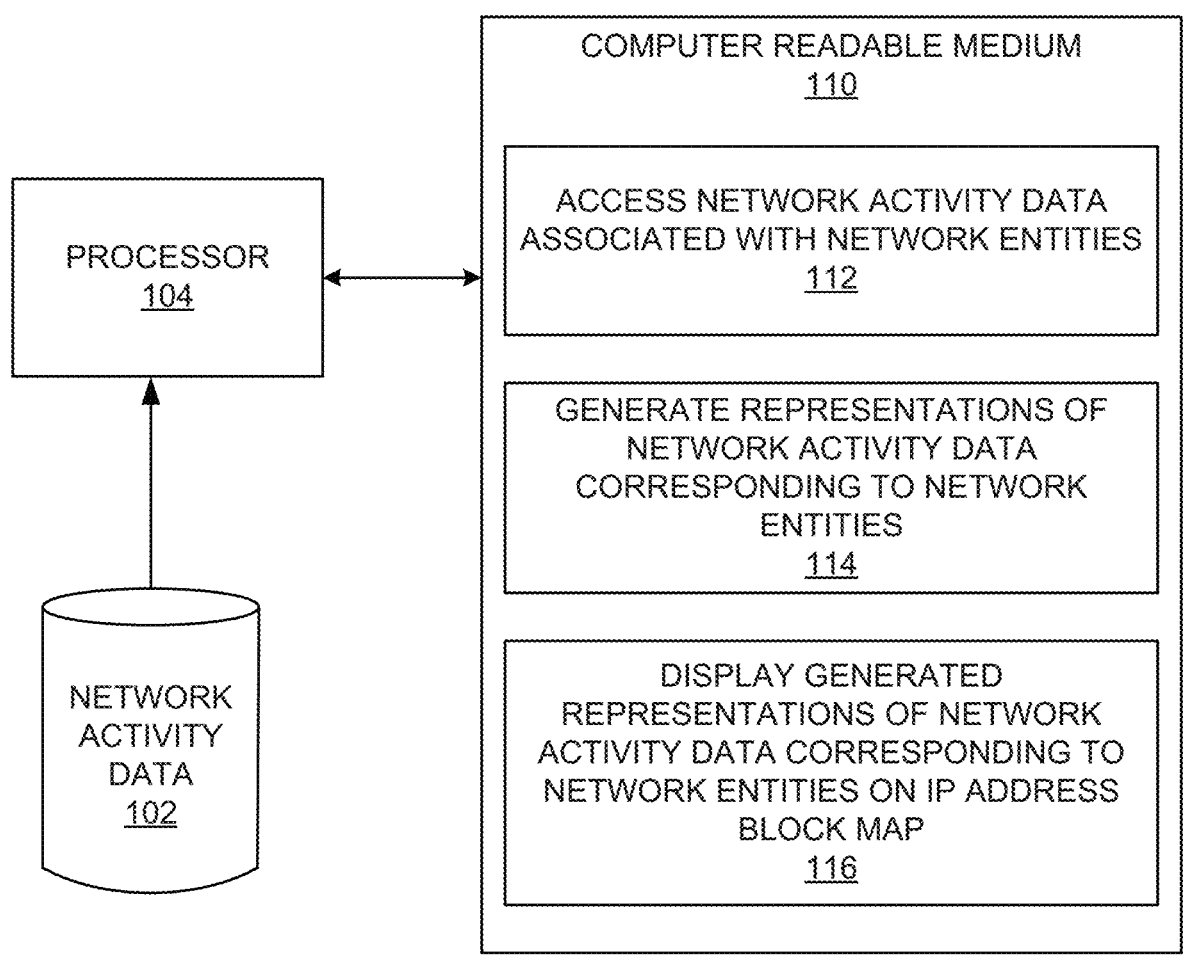
FIG. 1 shows an example apparatus that may generate and display network activity data.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses and methods for displaying network activity data. The apparatuses disclosed herein may also be referred to as data visualization systems. As used herein, network activity data may refer to data moving across a network at a given point in time. Network activity data in computer networks is mostly encapsulated in network packets traveling between network nodes representing different network entities, such as servers, gateways, switches, computers, computer clusters etc. that provide the data in the network. The network activity data sent or received by a network entity, such as a network node, may represent activity data of the network entity. As discussed herein, the network activity data may be processed and converted into a visual representation of the data. Processing of the network activity data may include data summarization, which may involve producing a compact description of an original large data set often referred to as a summary. In an example, the data summarization process may compact network activity data so that the data visualization system disclosed herein may process the data and render the processed data on a screen of a display device, while the processed data contains a sufficient amount of valuable statistical data for efficient analytics.

Network activity or traffic data, such as NetFlow logs, may retain records for every flow on a network between all network entities. On a busy network, this may amount to terabytes (or even more) of network activity data gathered per day. This large amount of network activity data may often make it difficult for the network activity data to be displayed in a meaningful manner, e.g., with sufficient detail to enable efficient analytics to be performed from the displayed data. According to examples, the network activity data collected over a time period may be reduced to network activity data associated with a particular local network belonging to a single organization or to a set of related organizations and may be displayed to accurately reflect meaningful information about the local network. As discussed herein, this network activity data may be summarized and visualized on a block IP address map representing a local network of the organization. Some organizations may have a very fragmented IP address space, as they may have added IP address space over time due to organization growth or merger and acquisition activity. In examples, multiple IP address block graphs may be aggregated into a single graph (e.g., a block IP address map) representing a single logical view of the organization's network. Particularly, for instance, one of the IP address block graphs may map activity by a first set of network entities (e.g., network entities having a first range of addresses) and another one of the IP address block graphs may map activity by a second set of network entities (e.g., network entities having a second range of addresses).

The apparatuses and methods disclosed herein may generate an IP address block map for network entities using the organization's assigned IP address space as a grid. For example, the apparatuses and methods disclosed herein may generate an IPv4 or an IPv6 address block map of the organization's network. That is, the IP address block map may map features of the network entities based upon their respective IP addresses. The IP addresses may each include a network prefix set of bits that specifies the network identifier of the network entity and sets of bits that identify the network entity. In other words, each network entity may be plotted on the IP address block map at a particular location defined by bits in the IP address in a manner that may be similar to a geographical map where a house or an object is shown based on its geo-location coordinates.

IP addresses may be assigned to networks in different sized blocks. The size of the assigned block may be written after an oblique (/), which shows the number of IP addresses contained in that block. For example, if an Internet Service Provider (ISP) is assigned a "/16", the ISP may receive around 64,000 IPv4 addresses, e.g., IP addresses that are assigned a "/16", the network prefix is 16 bits long and the network entity identifier is also 16 bits long. In IP addresses that are assigned a /24, the network prefix is 24 bits long and 8 bits are allocated for the network entity identifier, which may provide for up to 256 IP addresses. The IP address block map disclosed herein may employ fixed network entity identifiers that specify the network space to which the network entity belongs. Each network entity on the network may be identified on an IP address block map using the X and Y coordinates represented by two sets of bits of the IP address that identify the network entity. Network activity for each of the network entities defined by the IP address may be monitored and collected over time and may be displayed or overlaid on the IP address block map over the location of the network entity identified by the IP address. In an example, for a 2D map, the IP address space may use the entity identifier that is equal to or larger than 8 bits. In this example, one dimension of the IP address block map may use the last 8 bits of the IP address and the other dimension may use n−8 bits, where n is the length of the network entity identifier, and 9≤n≤16.

In examples, the network activity data displayed on the IP address block map may represent any of activity volumes, data volumes, data rates, combinations thereof, or the like. The activity volumes may include a number of flows, connections, requests, responses, transactions, or other network attributes recorded over a time interval. The data volumes may include a sum of bytes across all flows, connections, requests, responses, transactions, or other attributes that may be summed over a time interval. The data rates may include a data count or a sum divided by the duration of the time interval. The network activity may be application-agnostic in terms of network level measurements or network activity may be application-specific (e.g., counts, sums or rates for Hyper Text Transfer protocol (HTTP), Domain Name System (DNS), email, and other applications). Additionally, network information may correspond to request volumes of the network entities, activities by file types on the network entities, activities by request methods on the network entities, activities of the network entities, non-HTTP communication activities of the network entities, requests for unexpected domains by the network entities, domain name server activity by the network entities, and combinations thereof.

The network activity data may be rendered on the IP address block map using multiple display parameters such as color, opacity, shape, size, etc., as demonstrated by examples of the IP address block maps discussed below and shown in FIGS. 5-12.

FIG. 1 shows a block diagram of an example apparatus 100 that may generate and display network activity data. It should be understood that the apparatus 100 may include additional components and that some of the components described herein may be removed and/or modified without departing from a scope of the apparatus 100 disclosed herein.

The apparatus 100 may be a computing device, a tablet computer, a server computer, a smartphone, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the apparatus 100 may include multiple processors, multiple cores, or the like, without departing from a scope of the apparatus 100.

The apparatus 100 may also include a non-transitory computer readable medium 110 that may have stored thereon machine-readable instructions that the processor 104 may execute. Examples of the machine-readable instructions are shown as 112-116 and are further discussed below. Examples of the non-transitory computer readable medium 110 may include an electronic, magnetic, optical, or other physical storage device that contains or stores executable instructions. For example, the non-transitory computer readable medium 110 may be a Random Access memory (RAM), an Electrically Erasable Programmable Read-Only Memory (EEPROM), a hard disk, an optical disc, or other type of storage device.

The processor 104 may fetch, decode, and execute the machine-readable instructions 112-116. For example, the processor 104 may execute the machine-readable instructions 112 to access network activity data 102 associated with network entities, which may be stored in a data store. The network activity data 102 may be collected at a data broker, such as for example, Apache™ Kafka. As discussed above, the network activity data 102 may pertain to activity volumes, data volumes, data rate, or the like. The processor 104 may execute the machine-readable instructions 112 to access network activity data collected over a time period associated with a plurality of network entities.

Each of the network entities may be assigned a distinct internet protocol (IP) address including a network prefix set of bits and a network entity identifier set of bits, in which the bits in the network prefix set and the network entity identifier are non-overlapping with respect to each other. For example, an IPv4 address may include four sets of bits "A.B.C.D", where the sets of bits A and B specify the network prefix and the sets of bits C and D identify the network entity corresponding to an address, in which bits in the sets of bits "A.B.C.D" are non-overlapping with respect to each other. As discussed herein, each network entity on the network may be identified on an IP address block map, in which the X and Y coordinates may represent the sets of bits C and D that identify the IP address of the network entity. In addition, the sets of bits A and B in the address may identify the network to which the entity belongs. In other examples, network entities having a first range of IP addresses may be identified on a first IP address block map, network entities having a second range of IP addresses may be identified on a second IP address block map, etc.

The processor 104 may execute the machine-readable instructions 114 to generate representations of the network activity data corresponding to the respective network entities. In addition, the processor 104 may execute the machine-readable instructions 116 to display the generated representations of the network activity data corresponding to the respective network entities on an IP address block map according to the network entity identifier set of bits of the respective network entities. In other words, the activity associated with a network entity may be displayed on the IP address block map over the location of the network entity on the map. The IP address block map with the network activity data displayed on the IP address block map may provide a graphic representation of the organization's network activity and may also be referred to as a graph.

The network activity data may be displayed on the IP address graph using multiple display parameters such as color, opacity, shape, size, etc. For example, a high activity volume may be represented by red squares, medium—by yellow squares, and low—by green squares. The activity volume may additionally or in other examples be represented by shapes of various sizes such as, for example, squares, rectangles, circles, etc. According to examples, the display parameters of the network activity data displayed in an IP address graph may be based upon various information pertaining to the network entities. For instance, supplementary data, such as IT Operations Management data, may be accessed and used to identify, e.g., roles associated with different IP addresses. Using this information, the display parameters of the network activity data and/or generated alerts may be altered. For example, if a high volume of HTTP traffic from an IP address is determined and that IP address is known to be a Web server, a determination may be made that this level of activity is likely not that suspicious. In this example, the element displayed on the IP address graph corresponding to that IP address may have a particular color (e.g., red, which may denote the particular volume), but the size of the element may not be increased.

However, in another example in which a high volume of HTTP traffic involving an IP address that is supposed to be a DNS server is detected, a determination may be made that this activity may be suspicious. In this example, the size of the element displayed on the IP address graph corresponding to that IP address may be increased and an alert may be generated.

Figure 2:
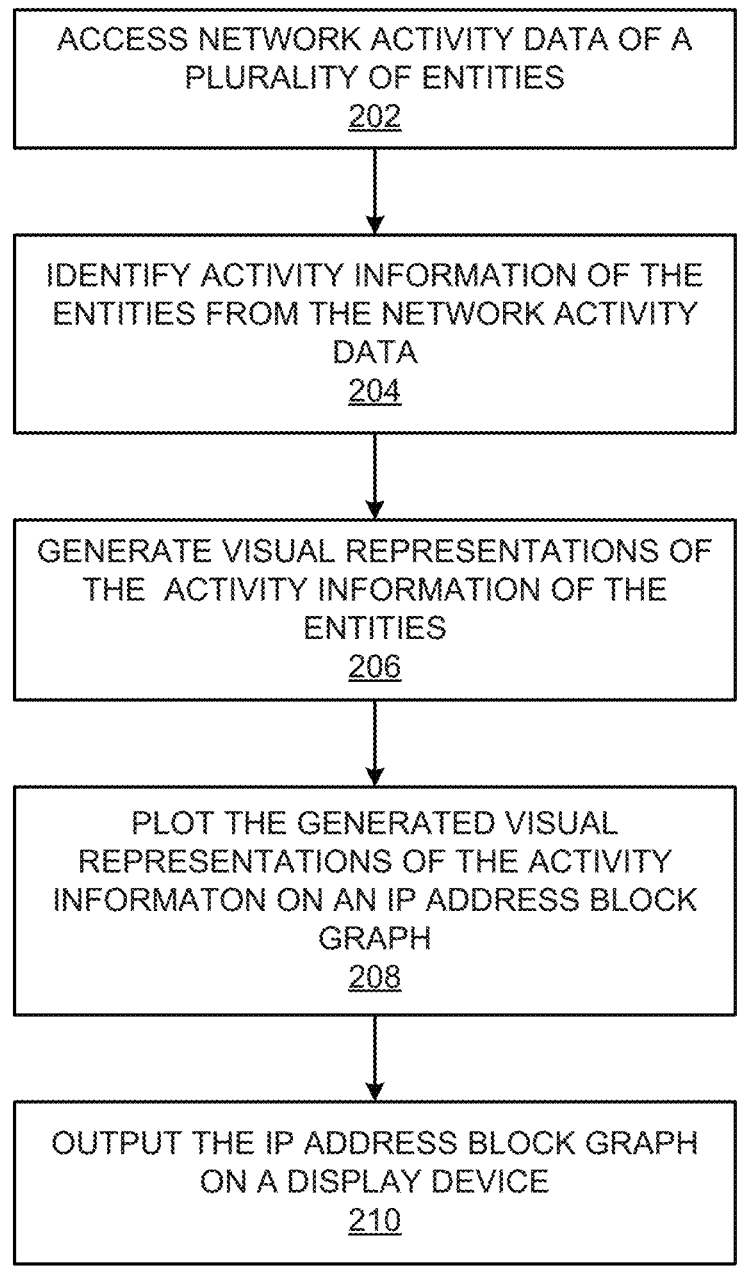
FIGS. 2, 3, and 4 respectively, show flow diagrams of example methods for generating and displaying network activity data.
Figure 3:
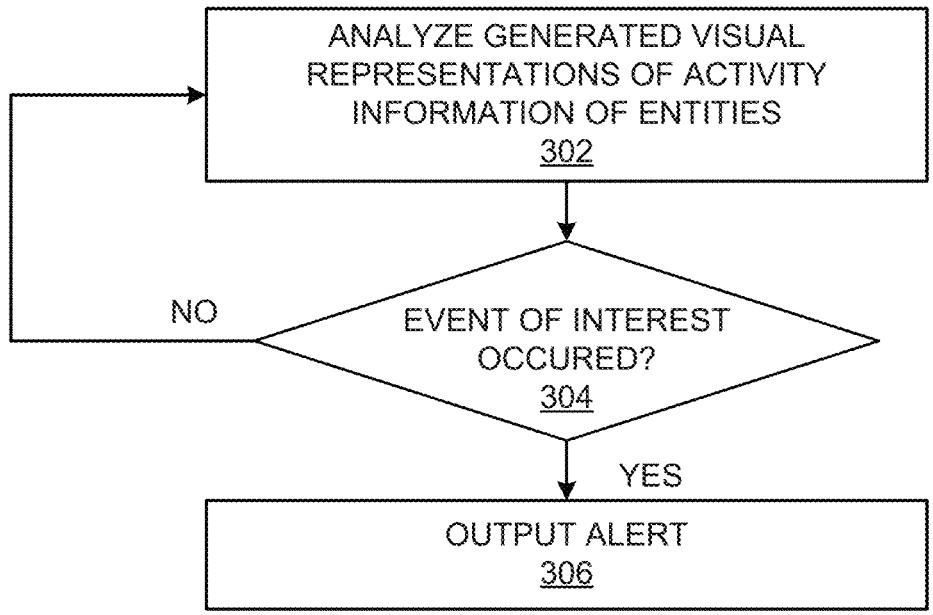
Figure 4:
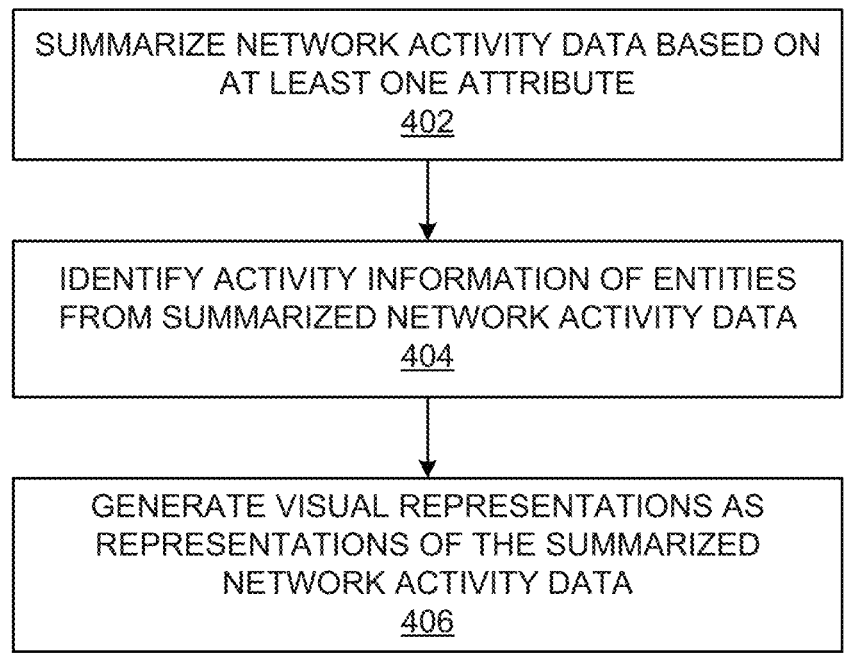

Turning now to FIGS. 2, 3 and 4, there are respectively shown flow diagrams of example methods 200, 300 and 400 for generating and display network activity data. It should be understood that the methods 200, 300 and 400 depicted in FIGS. 2, 3 and 4 may include additional operations and that some of the operations described therein may be removed and/or modified without departing from scopes of the methods 200, 300 and 400. The descriptions of the methods 200, 300 and 400 are also made with reference to the features depicted in FIG. 1 for purposes of illustration. Particularly, the processor 104 of the apparatus 100 may execute some or all of the operations included in the methods 200, 300 and 400.

With reference first to FIG. 2, at block 202, the processor 104 may access network activity data 102 of a plurality of entities, which may be any combination of servers, gateways, switches, computers, compute clusters, etc. As discussed above, each of the entities may be in the same, a common, or a related network and may be assigned a distinct IP address in the network. At block 204, the processor 104 may identify activity information of the entities from the accessed network activity data. As discussed above, the network activity information may correspond to request volumes of the network entities, activities by file types on the network entities, activities by request methods on the network entities, activities of the network entities, non-HTTP communication activities of the network entities, requests for unexpected domains by the network entities, domain name server activity by the network entities, or the like.

Figure 5:
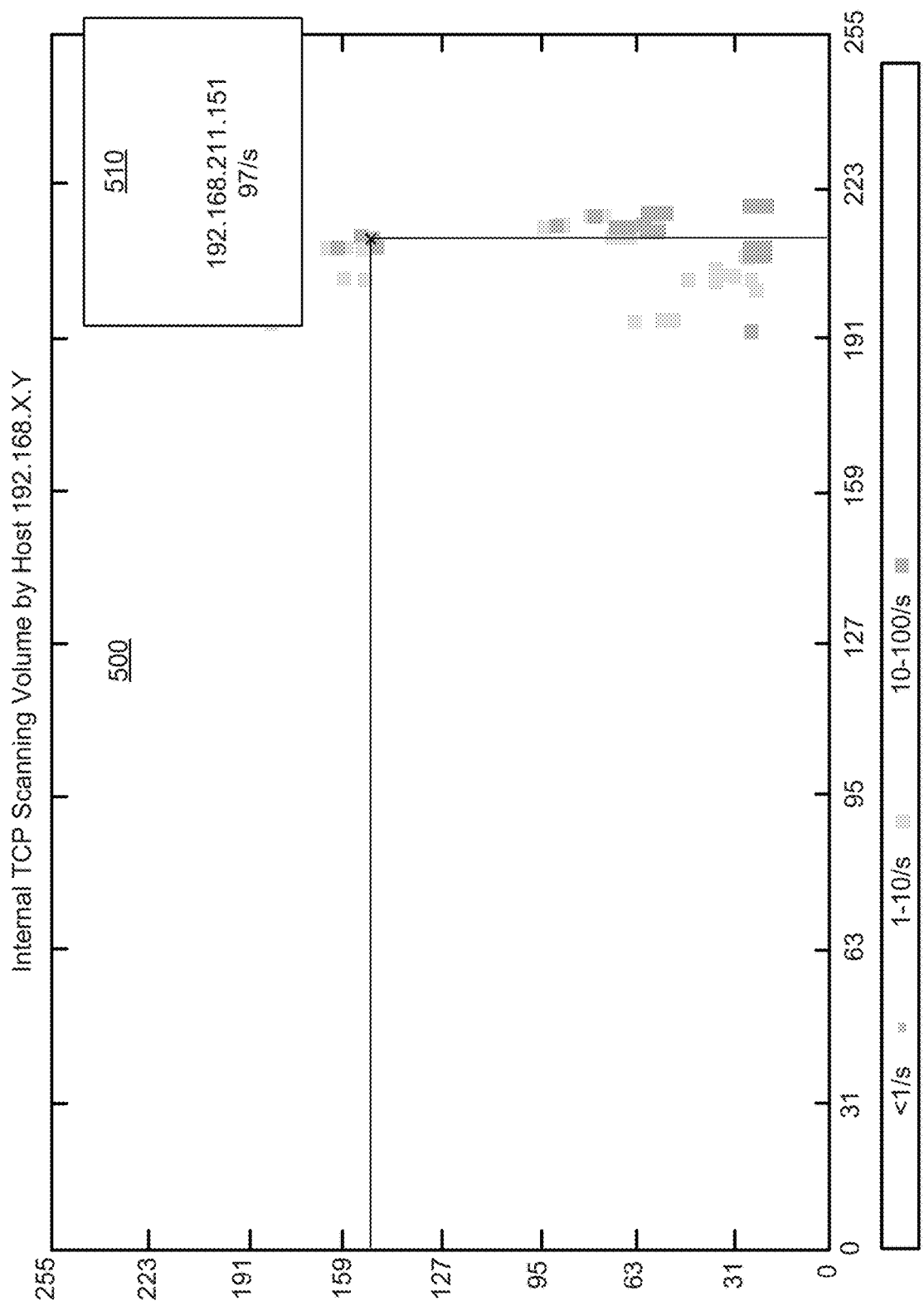
FIGS. 5-12, respectively, show example IP address block maps depicting various types of network activity data.

At block 206, the processor 104 may generate respective visual representations of the activity information of the entities. As discussed above, the visual representations may employ different display parameters or attributes such as color, shape, opacity, or the like. At block 208, the processor 104 may plot the generated visual representations of the activity information on an IP address block graph (or map). In an example, the generated visual representations may be plotted according to the first identifier set of bits and the second identifier set of bits of the IP addresses of the entities to which the generated visual representations correspond. In other words, the visual representations of the activity of the entity may be overlaid over the location of the entity defined by the coordinates derived from the IP address. The coordinates may be converted from a binary (bits) to integer form. At block 210, the processor 104 may output the IP address block graph with the plotted visual representations for display on a display device. Thus, the displayed IP address block graph may explicitly show the activity levels for each of the entities within an organization's network. An example of an IP address block graph on which is plotted visual representations of the network activity data is shown in FIG. 5.

Turning now to FIG. 3, at block 302, the processor 104 may analyze the generated visual representations of the network activity data of the entities. This may include comparing the activity information volumes to threshold values or to some average or normal values for a given entity. At block 304, the processor 104 may determine, from the analyzed visual representations, whether an event of interest has occurred. If the event of interest has occurred at block 304, the processor 104 may output an alert to a user as indicated at block 306. In other words, if an activity of a certain entity has exceeded a threshold value, the user may be notified. For example, if a number of scans at a certain entity exceeds a normal value, this may indicate an intrusion or an initiation of a denial of service attack. Otherwise, the processor 104 may return to block 302 and may continue to analyze the generated visual representations.

According to examples, the processor 104 may analyze a plurality of the visual representations (IP address block maps) of the network activity data generated for a relatively large number of queries, e.g., more than about 20 queries, and may determine which of the generated visual representations may be of particular interest to a user. For instance, the processor 104 may identify the visual representations that may warrant issuance of alerts as being of particular interest to a user. As another example, the processor 104 may identify the visual representations that display representations of data that meet a preset condition as being of particular interest to a user. In addition, the processor 104 may output an indication of the visual representations that are determined to be of particular interest to a user. In this regard, the processor 104 may inform a user of visual representations of interest, which may enable the user to identify the interesting visual representations without having to manually analyze all of the visual representations.

Turning now to FIG. 4, at block 402, the processor 104 may summarize the network activity data accessed at block 202 (FIG. 2) based on an at least one data attribute or a set of attributes. The data attributes may reflect parameters of network entities such as, for example, source and destination ports. The attributes may include flags or type of service (ToS) attributes or the like. For example, the processor 104 may summarize data reflecting activity at a source port or at a destination port. In an example, the processor 104 may also summarize the data based on activity of a certain ToS. The visual representations of the network activity data may be generated using a summary of all network activity data accumulated into a data set. The summary may preserve the characteristics of the data set to be visualized. For example, in the case of scanning attacks, security analysts often visualize the range of ports or IP addresses that were targeted with small flows in a short period of time. Similarly, various visualizations may be used to understand the distribution of flows between the entities of a certain type over time. In an example, when the apparatus 100 detects that a certain attribute of the activity data set is not frequently queried, the apparatus 100 may maintain a more succinct or compacted representation of the network activity data with this attribute. At block 404, the processor 104 may identify the activity information of the entities from the summarized network activity data. Thus, the activity information to be used on the IP address graph may be generated from a reduced (summarized) data set of all of the activity data accumulated over a time period. At block 406, the processor 104 may generate the visual representations as representations of the summarized network activity data.

Some or all of the operations set forth in the methods 200, 300 and 400 may be contained as utilities, programs, or subprograms, in any desired computer accessible medium. In addition, the methods 200, 300 and 400 may be embodied by computer programs, which may exist in a variety of forms. For example, the methods 200, 300 and 400 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

FIGS. 5-12 show examples of IP address block maps depicting network activity. FIG. 5 shows an example graph 500 depicting an IP address block map for the network 192.168.x.y, which may be a class B network. On this graph 500 (IP address block map), different shaded squares are used to illustrate the rate of scans issued by each host on that network. As the host scan rate increases, the size of the squares may increase accordingly. Note that the colors are not shown in a gray-scale representation of the map depicted in FIG. 5, but the actual graph may use different colors. As this graph 500 shows, there may be a few hosts on this class B network that issue a large volume of scans. In addition, most of these hosts are on just a few /24 subnets (192.168.X.*). In many enterprises, the organization's IP address space is assigned in chunks to different business units. Therefore, the suspicious hosts appearing on the same (or nearby) vertical line in the IP address block map 500 are likely to belong to the same administrative domain. Thus, the security issues associated with these suspicious hosts may be assigned to the same administrator, which may speed up security and clean up procedures.

With a graph 500 like the one shown in FIG. 5, a chief information security officer (CISO) may quickly see how pervasive a specific problem is across the network. This type of graph may concisely present a view of a large IP address space. For many organizations, the entire network may be visualized down to the host level using a single IP address block map. Maps like the one shown in FIG. 5 may help an analyst determine where unexpected or suspicious activity is occurring, thus generating "leads" for further investigations. As may be seen in FIG. 5, the graph 500 may have "tracking lines" for a pointer. Once the pointer is placed over a data point of interest, the tracking lines may indicate the IP address of the point of interest (or the IP address range, if each point of interest represents more than one IP address). If an organization's IP address space is smaller than a /16 (class B), the example graph 500 may still be used. In this case, the portions that are outside of the organization's address space may not be populated. If an organization has a larger contiguous assignment (e.g., a /8 or class A), each square on the graph 500 may represent a /24 subnet (up to 256 hosts). In this case, an analyst/administrator/CISO may still be able to quickly see where there are problem areas on the network, and then follow the leads to drill deeper and determine which specific IT assets are responsible for the problems.

The graph 500 may be generated to reflect network activity of IPv6 addresses provided that the host identifiers are assigned in a non-random order. In this case, the graph 500 may provide a high-level view where each square represents the activity of a larger group of the IP addresses. Then, for any squares that represent the activity of interest, a new map at a finer granularity may be generated to enable an analyst to drill deeper. The IPv6 address space may need several levels of drill down as compared to the IPv4 due to a much larger address space provided that an organization allocates its host identifiers in an intelligent (non-random) manner. The IP address block graph 500 shown in FIG. 5 may show results for a specified interval of time (e.g., an hour, a day, a week, etc.). In an example, the IP address block graph 500 may show a third dimension indicating time to illustrate how the behavior of the hosts changes over time. It should be noted that the apparatuses and methods described herein are not specific to NetFlow data. Instead, the apparatus 100 may be used with any data set that includes the IP addresses of the network to be mapped. For example, the processor 104 may use data extracted from web proxy logs.

Figure 6:
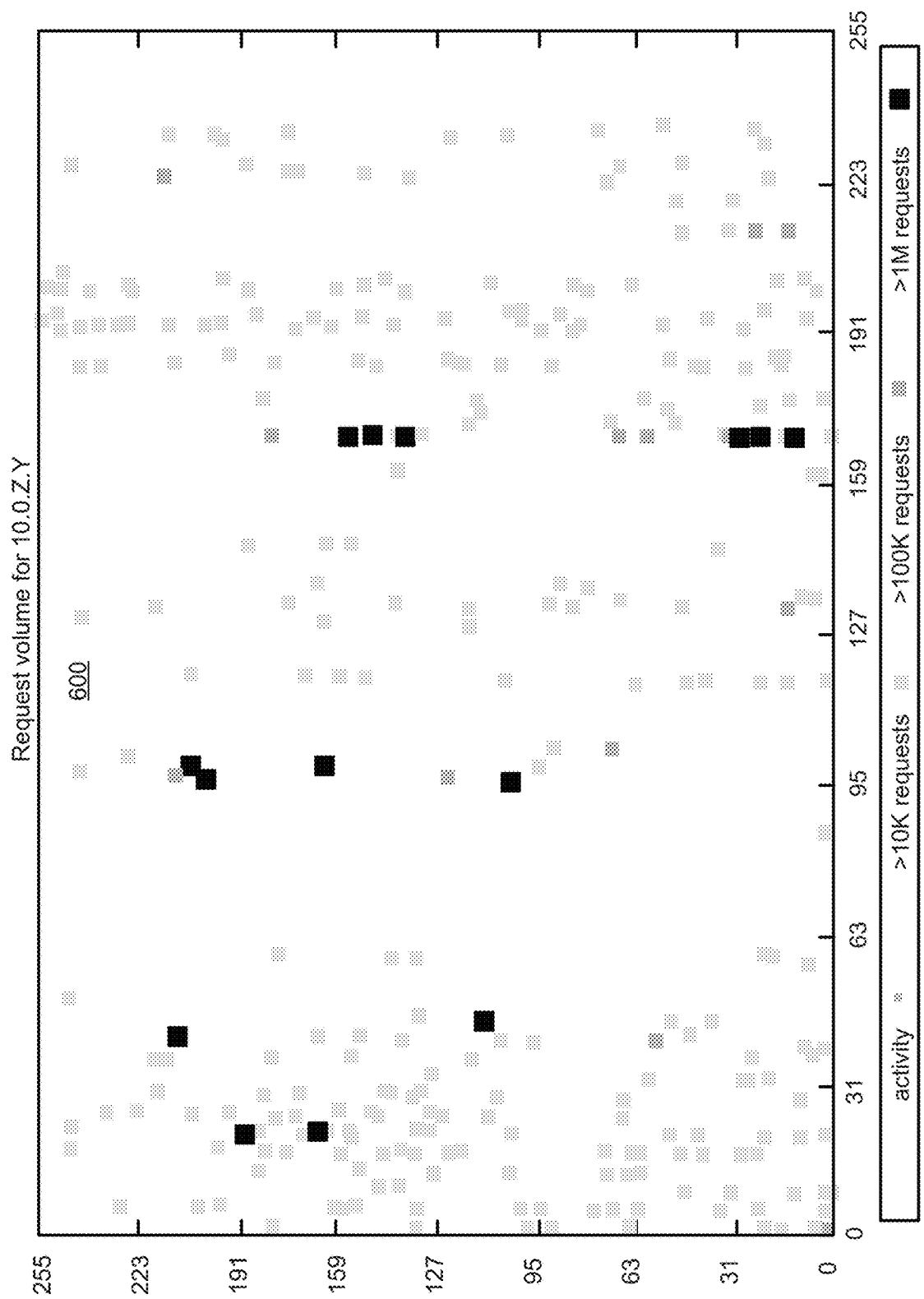

FIG. 6 shows an example IP address block map 600 representing request volumes for an organization's network. An example query may determine the volume of requests in a proxy log by client IP address. In some examples, the data set used may have already been loaded into an analytics engine, and the IP addresses may be represented as strings rather than integers. As a result, the query may have to convert the IP addresses to integers first. In an example, the IP addresses may be stored as integers to simplify query execution. The output of the query is a set of tuples: X-coordinate, Y-coordinate, value. These tuples may be then used to create the IP address block map 600 shown in FIG. 6. To improve the transfer of information to the viewer, the apparatus 100 may use additional dimensions that may be referred to as display parameters. For example, the apparatus 100 may use different colors, different opacities, different shapes, and/or different sizes or shapes in specific ways in order to intuitively convey multiple dimensions in a two-dimensional graph.

In the example graph 600 shown in FIG. 6, the level of activity for each IP address in 10.0.0.0/16 was divided into five categories. Please note that the visual representations shown in FIG. 6 are depicted in a grayscale color scheme. However, the actual graph 600 depicted in FIG. 6 may display activity data using white, gray, green, yellow, red, etc., colors. Other colors may be used as well to distinguish between the activity representations. If a location on the map 600 with coordinates (x, y) is white, this may be an indication that no activity has been recorded for the IP address 10.0.x.y. This may be useful for identifying missing data. For example, if an administrator knows that there should be activity for a given IP address and the location on the map 600 corresponding to the given IP address is white, the administrator may determine that there is missing data for the given IP address.

By way of particular example, if a square with coordinates (x, y) is gray, then some modest number of requests has been recorded for the IP address corresponding to those coordinates. If a square with coordinates (x, y) is green, then the IP address corresponding to those coordinates had between 10,000 and 100,000 requests during the measurement interval. If a square with coordinates (x,y) is yellow, the IP address corresponding to those coordinates had between 100,000 and 1 million requests during the measurement interval. If a square with coordinates (x,y) is red, the IP address corresponding to those coordinates had more than 1 million requests.

In addition or in other examples, the sizes of the squares may be also increased for the higher request volumes, in order to make those particular IP addresses easier to notice. In instances in which a small subset of IP addresses exceeded a large number of requests (e.g., 1 million requests) during a measurement interval, a determination may be made that the hosts corresponding to the subset of IP addresses may be doing something malicious. An analyst may be able to issue additional queries to determine if this behavior is problematic. If a supplementary data, e.g., data indicating the role of each IP address is available, the supplemental data may be employed to further refine the display of information corresponding to the IP addresses. For example, an alert may not be issued if an IP address assigned to a web server has a high number of HTTP flows, but an alert may be issued if an IP address assigned to a DNS server has a high number of HTTP flows. Thus, the icons representing both the web server and the DNS server may be displayed in red, but the size of the icon representing the web server may remain normal, while the size of the icon for the DNS server may be displayed in a larger size to make that IP address stand out as having a potentially abnormal activity.

According to examples, the user interface may enable the IP address associated with a data point on the screen to be identified, so that a user may not need to infer the IP address from the coordinates. For example, clicking on the data point may result in a pop up window being displayed above the data point that includes metadata about the data point, including the IP address and the exact value of requests corresponding to the IP address. In an example, a user interface may draw a horizontal and vertical line (as shown in FIG. 5) that track the cursor, with a pop-up window 510 to show the IP address 192.168.211.151 and a value indicating scanning volume of 97/s of the data point.

As may be seen from FIG. 6, there may be a large number of vertical lines on the graph 600 because the graph 600 may represent a large IP address block (/16 in this case). This large IP address block may further be subdivided within the organization. For example, the local organization may use a series of /24 subnets internally, with different business organizations receiving their own /24 address blocks to manage. In this case, each vertical line may correspond to a different subnet (and potentially a different administrator). If horizontal lines are preferred over vertical lines, then in the query, the third octet (set of bits) may be associated with the Y value and the fourth octet (set of bits) may be associated with the X value.

Figure 7:
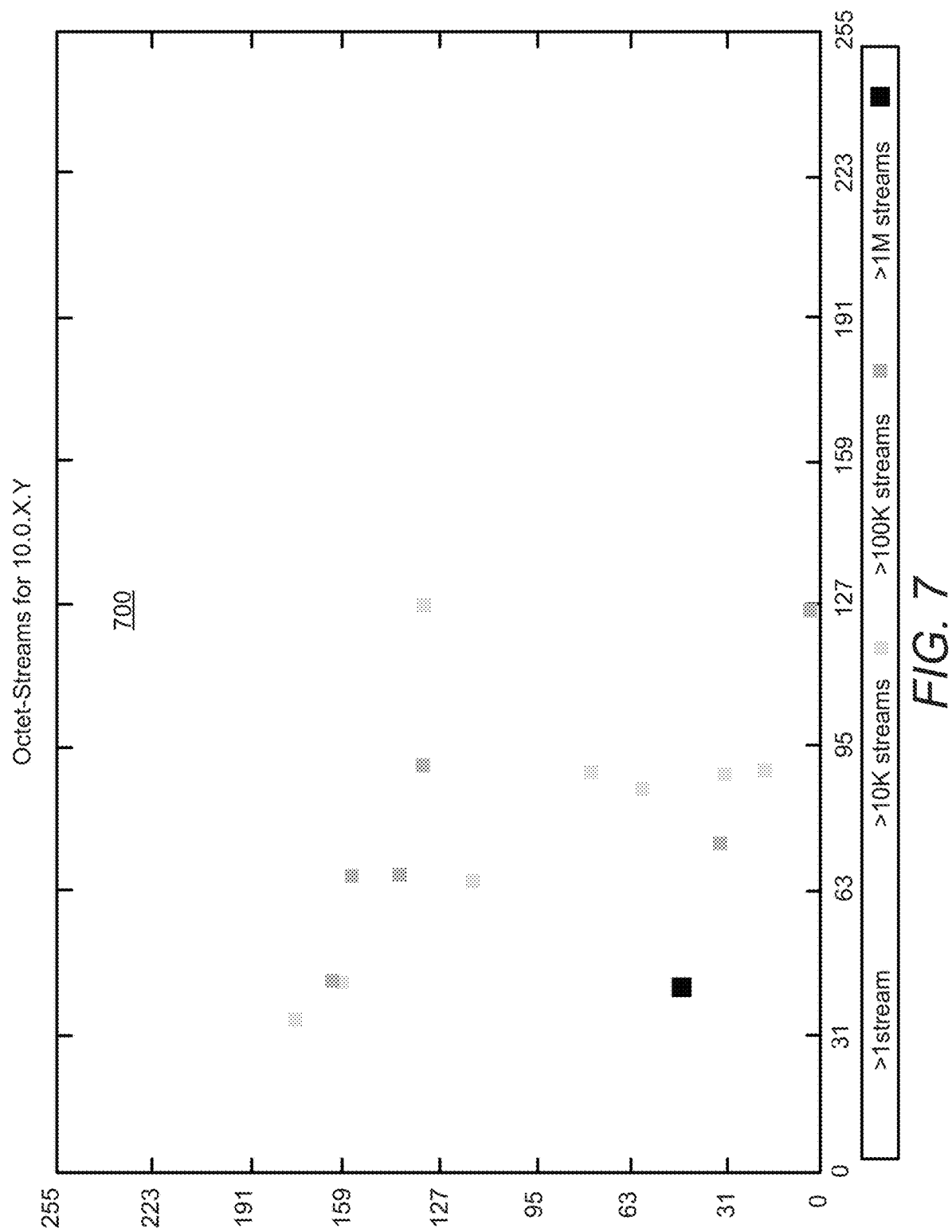

FIG. 7 shows an example graph 700 illustrating IP address activity by file type. In this example, a query may be augmented to look for other types of outliers such as file types. In this example, the apparatus 100 may search for "application/octet-stream", which is a binary file. In the example IP address map 700 depicted in FIG. 7, most of the IP addresses have relatively few requests involving octet streams. However, there is one IP address that has requested over 1 million octet-streams, and a few others that requested noticeably more than the rest of the hosts on the network. The graph 700 therefore graphically displays the outlier in a group of IP addresses.

Figure 8:
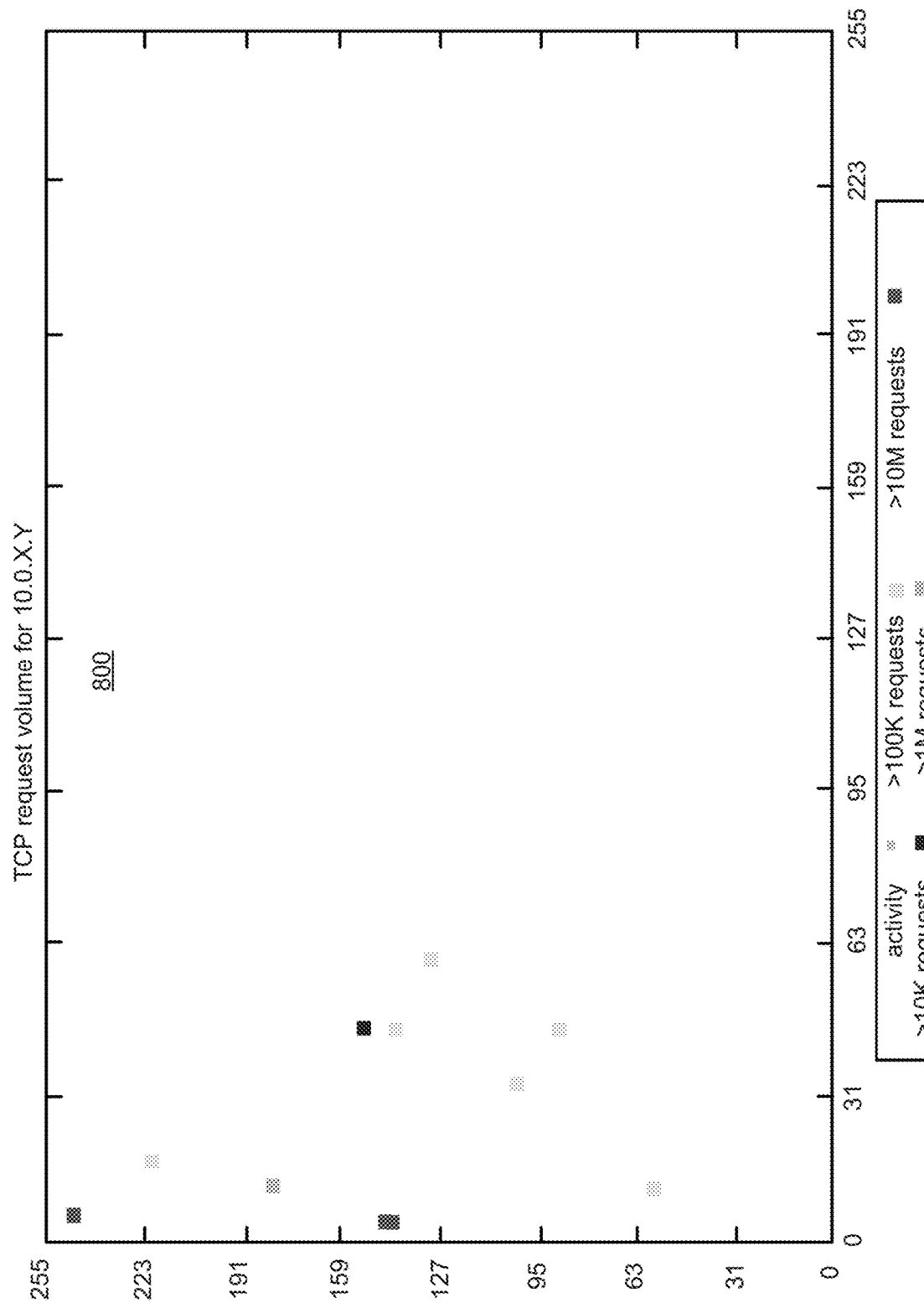

FIG. 8 shows an example graph 800 illustrating IP address activity by request method. A common request method is HTTP GET, which means that the client simply retrieved a copy of the specified object. A less common request method is HTTP POST, which means the client is sending data to the server. The graph 800 illustrates the HTTP POST method. As may be seen from FIG. 8, there may be relatively few IP addresses on the network issuing HTTP POST requests because most of the graph 800 is white. However, there may be a few hosts that have issued an excessively large number of POSTs—more than 10 million during the measurement period. The graph 800 may thus enable an analyst to quickly identify that such hosts are present in the network and may take a closer look at these hosts, because this activity may be an indication that the HTTP POSTs are being used to exfiltrate data from the local network.

Figure 9:
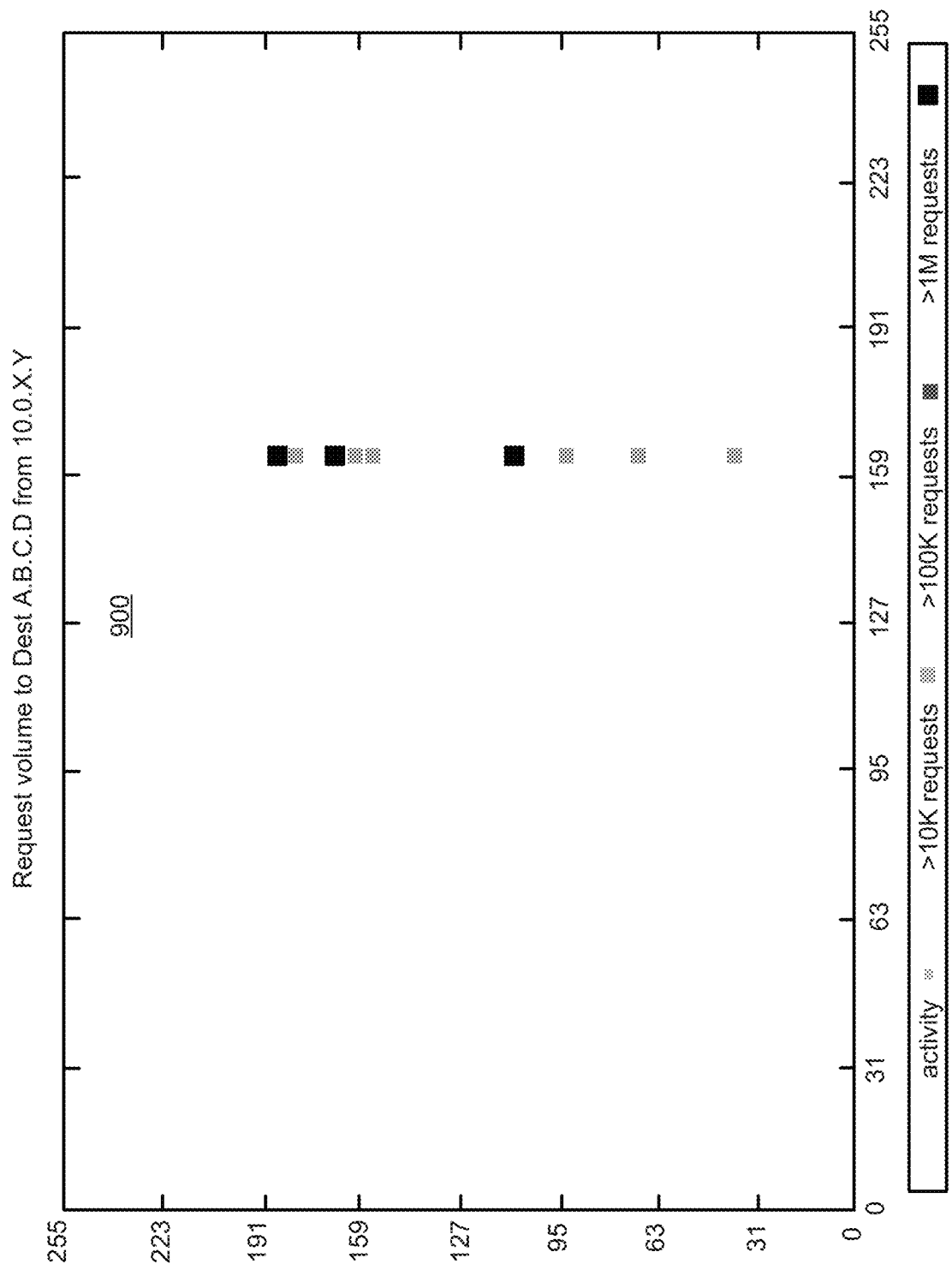

FIG. 9 shows an example graph 900 illustrating activity per anomalous host per IP address. The apparatus 100 may examine traffic involving a specific destination IP address or an IP address block. In the example shown in FIG. 9, a large number of requests destined to an IP address that belongs to an organization that issued a large number of scanning activity (which was noticed in NetFlow logs) have been recorded. Thus, the apparatus 100 may determine how many local hosts have been communicating with this specific IP address. As may be seen in FIG. 9, only 9 IP addresses in the entire /16 local IP address block have communicated with this particular external IP address, with three of the local IP addresses (all on the same /24 subnet) issuing over 1 million of HTTP requests each to this external host.

Figure 10:
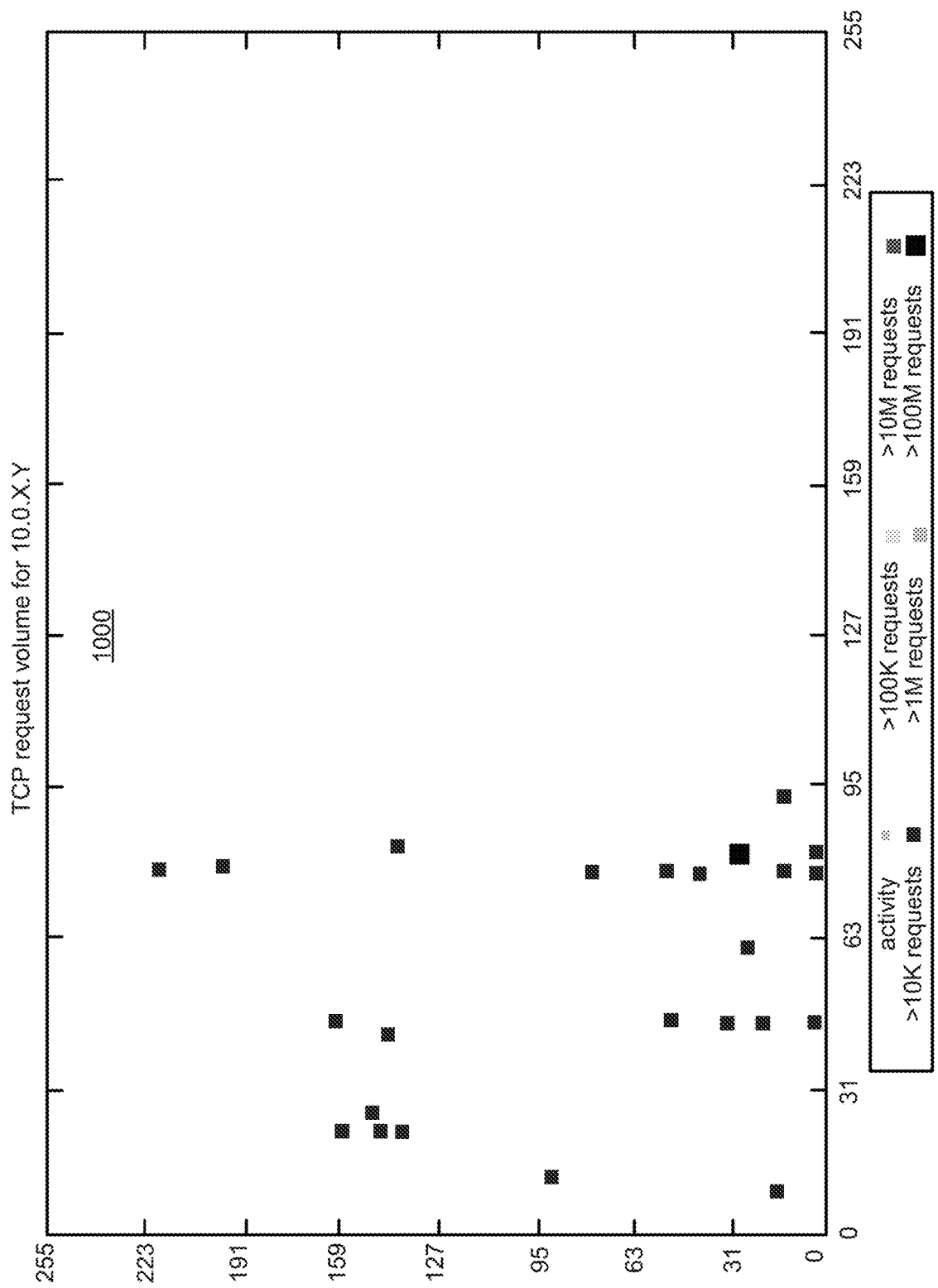

FIG. 10 shows an example graph 1000 illustrating non-HTTP communication activity per IP address. According to examples, application level details (e.g., method, file type, etc.) shown in previous examples may not be seen. However, the example graph 1000 depicted in FIG. 10 may show hosts that are using proxies for non-HTTP communication. For example, FIG. 10 shows that there is one host that is very different (over 100 M non-HTTP requests) than all of the other hosts in this /16 address space. While this may be "normal" for this node or may be caused by misconfiguration rather than something malicious, the graph 1000 may inform an analyst of this host.

IP address maps may also be used with Domain Name System (DNS) logs because DNS logs may record the IP address of the client that issued a DNS query. For example, an IP address block map may be used to visualize which hosts on a network are issuing requests for unexpected domains. Unusual domains may need to be identified first. In this example, the domain "chileexe77.com" is not known. Yet this domain is included in the Indicators of Compromise (IOCs) of an advanced persistent threat. Thus, local subnets or hosts that are issuing DNS requests for this domain may be identified.

Figure 11:
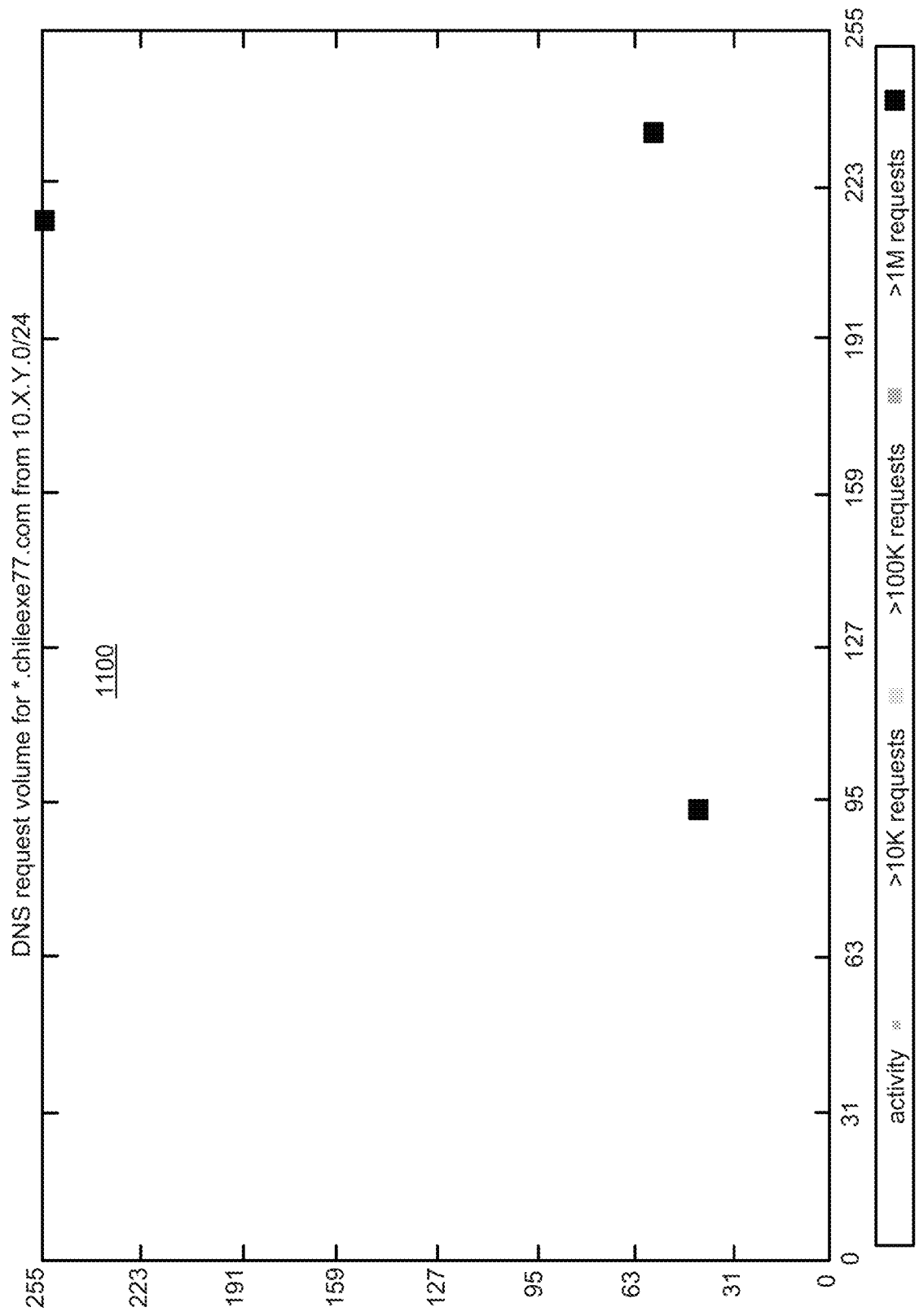

FIG. 11 shows an example graph 1100 illustrating volume of DNS requests on a class A network per IP address. In this example, an organization being visualized has a class A network (10.0.0.0/8). In addition, the IP address map 1100 may highlight which /24 subnets have a particular type of activity. In other words, each point on the address map 1100 represents 10.X.Y.0/24. If the example IP address map 1100 indicates that there is this sort of activity on the subnet, then an administrator may drill down to learn about the specific hosts involved. As may be seen from the IP address map 1100 in FIG. 11, three /24 subnets (large squares) have issued more than 1 million DNS queries for hostnames in the chileexe77.com domain.

Figure 12:
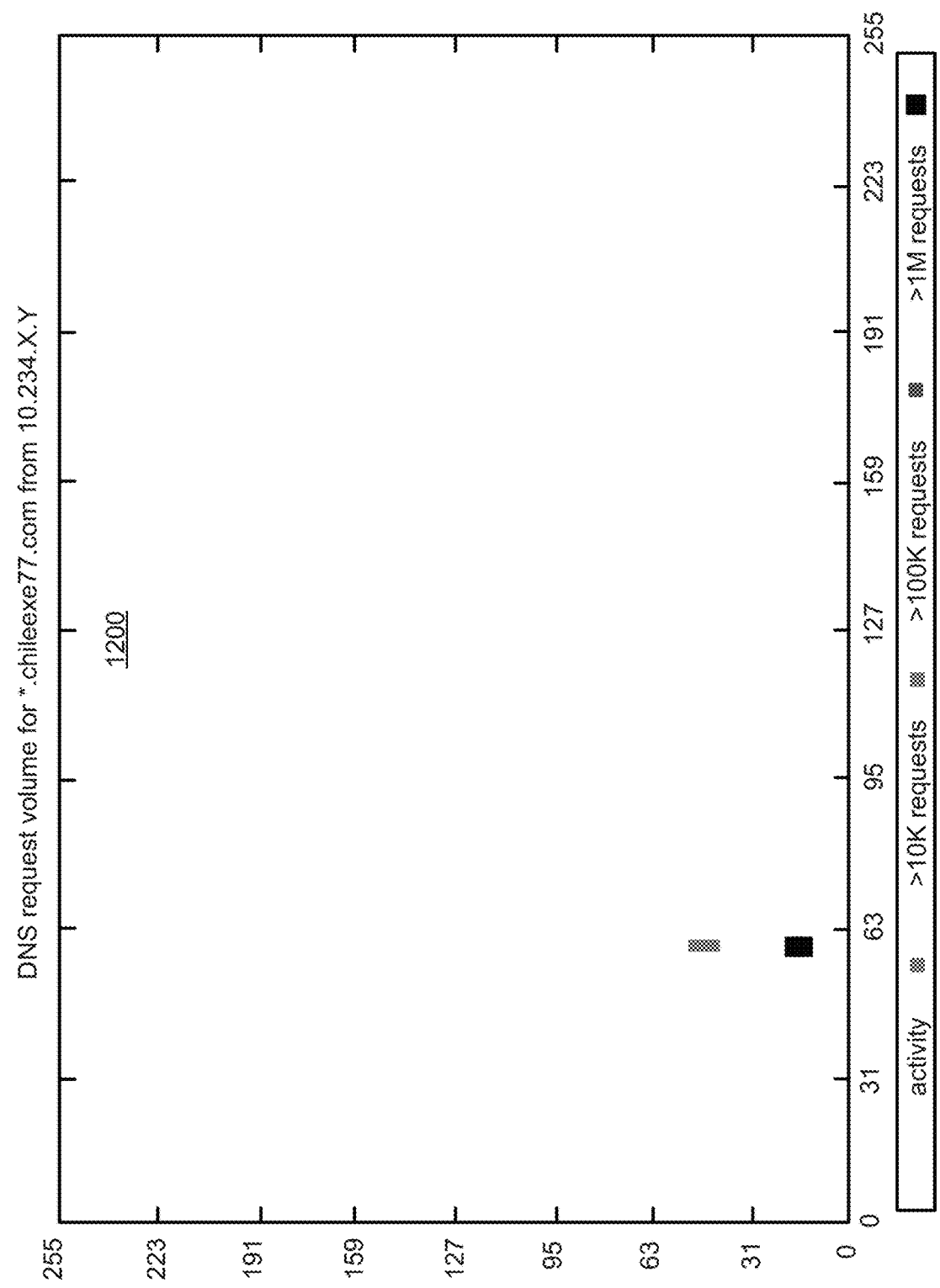

FIG. 12 shows an example graph 1200 illustrating volume of DNS requests on a class B network per IP address. As may be seen from the example IP address map 1200 depicted in FIG. 12, there are 9 IP addresses issuing queries for the chileexe77.com domain. The entities at addresses 10.234.58.{11-16} issued large volumes of requests, while the entities at addresses 10.234.58.{38-40} issued a small number of requests for this domain. In FIG. 12, some of the blocks representing the entities are shown as overlapping each other. Through use of the graph 1200, an analyst may identify that a small number of hosts may be examined more closely for possible compromise.

In some examples, the third set of bits (i.e., octet) may be better suited for the Y axis than the X axis in a "class B" map, where individual points represent a single IP address. Most modern display devices such as computer monitors are longer in a horizontal plane. Thus, the X axis may be used for the fourth set of bits (i.e., octet), which may always need to represent 256 distinct values. The Y axis may only need to represent 256 distinct values for a /16 address space, and fewer for smaller spaces. Therefore, a /16 network may be shown either as 10.0.X.Y or 10.0.Y.X based on the available screen space. In examples, the apparatus 100 may automatically change the axes as the screen orientation changes, for example, on a tablet or on mobile devices or when an analyst changes the orientation of his monitor.

According to examples, the IP address block maps disclosed herein may be used for class A and class B networks. However, many organizations may have IP address spaces smaller than either of these types of networks. For an IPv6 network, an organization may have an address space much larger than a class A (2^24 hosts). Thus, for an IPv6 network, more than one level of drill-down may be implemented. In those cases, the apparatus 100 may zoom in on the third set of bits (octet) in order to make the IP address block map show only the desired small address space. Some organizations may have a fragmented IP address space. That is, some organizations may have multiple non-contiguous blocks of an IP address space. This address space may be visualized using multiple IP address block maps. However, the apparatus 100 may temporarily re-map the address space in order to visualize the address space in a single aggregated map. The apparatus 100 may then lay out the IP address map appropriately so that the correct IP addresses may be displayed. Thus, the apparatus 100 may aggregate and present multiple non-contiguous IP address blocks as a single graph.

Figure 13:
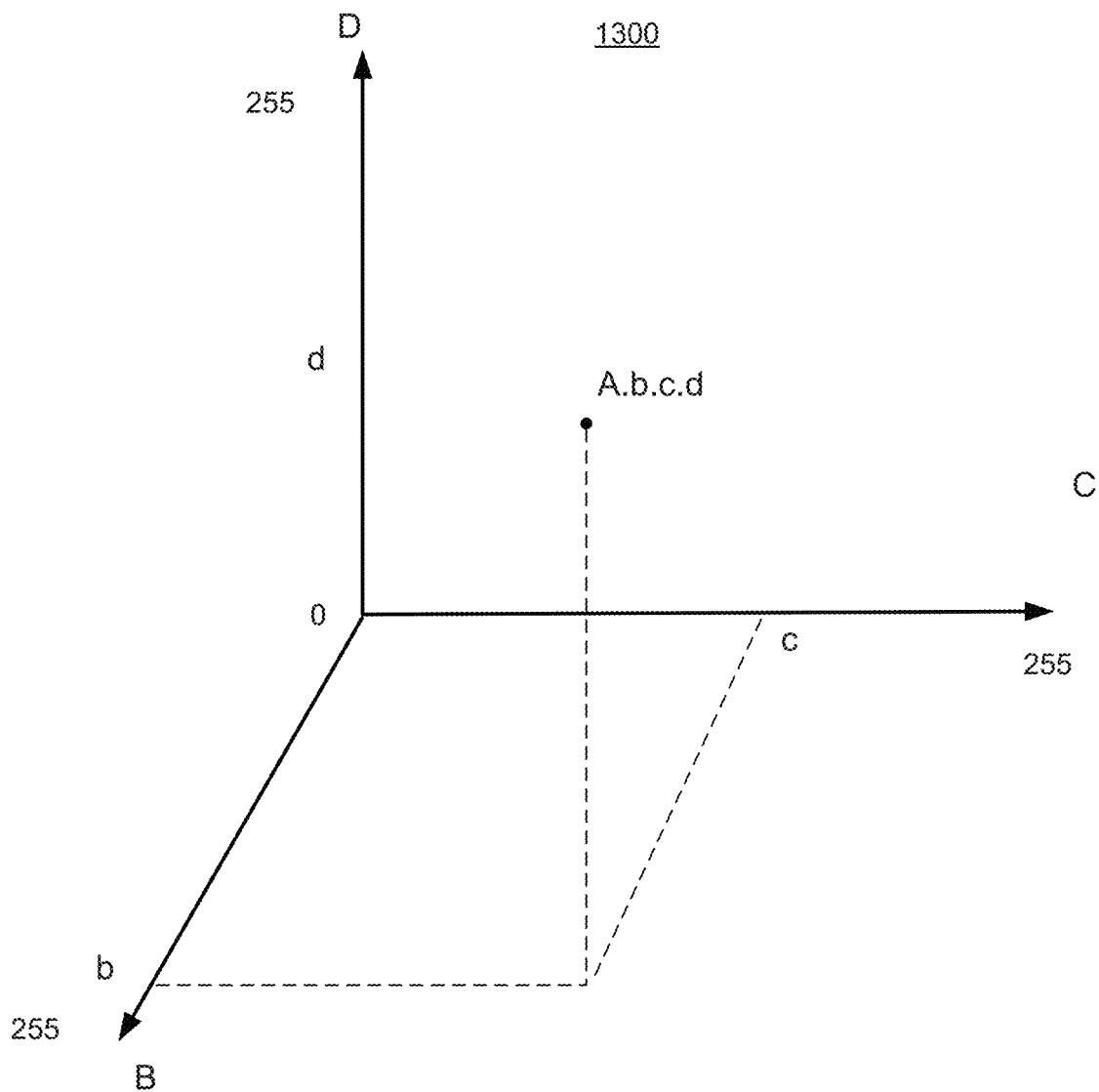
FIG. 13 shows an example 3D IP address block map.

In examples, the apparatus 100 may create a 3D IP address block map 1300 as shown in FIG. 13. The 3D IP address block map 1300 may use the first axis (B), the second axis (C), and a third axis (D). The third axis may correspond to one of the network entity identifier set of bits (i.e., octet). The 3D IP address block map 1300 may be used for a large IP address space (e.g., either a class A network or an address space that is larger than a class B network). The generated representations may be displayed on the three-dimensional IP address block map that may be referred to as a cube map. Such a cube map 1300 may be useful, for example, in a high-level view of the network activity like those typically used in a dashboard. A combination of an example 3D plot shown as A.b.c.d in FIG. 13 and an area highlight visualization technique like a heat map may be used to identify areas such as IP ranges in a network with interesting behavior. In other examples, a 4D representation may be created to cover all four sets of bits (i.e., octets) of the IPv4 addresses.

While the present disclosure mainly discusses visualization techniques for mapping IPv4 addresses, the same techniques may be applied to a different protocol like IPv6 as well. The IPv4 addresses are 32 bits long (four groups of eight bits) and the IPv6 addresses are 128 bits long (eight groups of 16 bits, which could be represented as four groups of 32 bits). The individual organizations may not need to visualize significantly larger portions of IP address space. Some descriptions of IPv6 addresses may include a routing prefix, a subnet id, and an interface identifier. According to examples, the entities on a network may be uniquely identified, which may entail using the subnet id+interface identifier together to represent the "entity", and the routing prefix as the network prefix. Alternatively, the entities on the network may be represented using a routing prefix+subnet id=network prefix and the interface identifier as the entity identifier, if the interface identifiers are uniquely assigned across the network rather than across subnets.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor;
   a memory on which is stored machine readable instructions executable by the processor to:
     access network activity data collected over a time period associated with a plurality of network entities, wherein each of the network entities is assigned a distinct internet protocol (IP) address comprising a network prefix set of bits and a network entity identifier set of bits;
     convert amounts of the network activity data collected over the time period into visual representations of the network activity data of the network entities;
     generate an IP address block map for the network entities by using the IP addresses assigned to the network entities to define locations of the network entities on the IP address block map;
     overlay the visual representations of the network activity data of the network entities over the locations of the network entities on the IP address block map; and
     cause a display of the IP address block map with the overlaid visual representations of the network activity data corresponding to the network entities.

2. The apparatus according to claim 1, wherein a first axis of the IP address block map corresponds to a first network entity identifier set of bits of the IP addresses and a second axis of the network IP address block map corresponds to a second network entity identifier set of bits of the IP addresses.

3. The apparatus according to claim 2, wherein the IP address block map comprises a three-dimensional map having the first axis, the second axis, and a third axis, the third axis corresponding to a third identifier set of bits of the IP addresses.

4. The apparatus according to claim 1, wherein the network activity data corresponds to activity volumes, data volumes, or data rate.

5. The apparatus according to claim 1, wherein the instructions are further executable by the processor to:
   summarize the network activity data collected over the time period based on at least one attribute; and
   generate the visual representations as representations of the summarized network activity data.

6. The apparatus according to claim 1, wherein the IP addresses of the network entities in the network activity data are in integer form and wherein the instructions are further executable by the processor to convert the IP addresses of the network entities from the integer form to the network prefix set of bits and the network entity identifier set of bits.

7. The apparatus according to claim 1, wherein the network activity data is stored in a data storage and wherein the instructions are further executable by the processor to:
retrieve the network activity data that is respectively associated with the network entities;
process the retrieved network activity data to output a set of tuples that identify the network activity data for each of the network entities; and
generate the visual representations of the network entities according to the set of tuples.

8. The apparatus according to claim 1, wherein the visual representations of the network activity data have different colors, sizes, or shapes to represent different amounts of the network activity data.

9. The apparatus according to claim 1, wherein the instructions are further executable by the processor to:
analyze the visual representations of the network activity data;
determine, from the analyzed visual representations, that an event of interest has occurred; and
based on the determination that the event of interest has occurred, output an alert.

10. The apparatus according to claim 1, wherein the instructions are further executable by the processor to:
generate a plurality of IP address block maps that display different sets of the visual representations of the network activity data of the network entities according to the network entity identifier set of bits of the IP addresses assigned to the network entities;
analyze the generated plurality of IP address block maps to determine an IP address block map that identifies an event of interest; and
output an identification of the determined IP address block map that identifies the event of interest.

11. A computer-implemented method comprising:
accessing, by a processor, network activity data of a plurality of entities, wherein each of the entities is assigned a distinct internet protocol (IP) address, each IP address including a network prefix set of bits, a first identifier set of bits, and a second identifier set of bits;
identifying, by the processor, activity information of the entities from the accessed network activity data;
converting, by the processor, amounts of the activity information of the entities into visual representations of the activity information of the entities;
generating, by the processor, an IP address block graph for the entities by using the IP addresses assigned to the entities to define locations of the entities on the IP address block graph;
overlaying, by the processor, the visual representations of the activity information of the entities over the locations of the entities on the IP address block graph; and
outputting the IP address block graph with the overlaid visual representations of the activity information of the entities for display on a display device.

12. The computer-implemented method according to claim 11, further comprising:
analyzing the visual representations of the activity information of the entities;
determining, from the analyzed visual representations, that an event of interest has occurred; and
based on the determination that the event of interest has occurred, outputting an alert.

13. The computer-implemented method according to claim 11, wherein the visual representations of the activity information have different colors, sizes, or shapes to represent the amounts of the activity information.

14. The computer-implemented method according to claim 11, further comprising:
summarizing the network activity data based on at least one attribute;
identifying the activity information of the entities from the summarized network activity data; and
generating the visual representations as representations of the summarized network activity data.

15. The computer-implemented method according to claim 11, wherein the IP address block graph comprises a three dimensional (3D) graph, wherein overlaying the visual representations further comprises additionally overlaying the visual representations according to a third identifier set of bits of the IP addresses to which the visual representations correspond, and wherein a first axis of the 3D graph corresponds to a range of the first identifier set of bits of the IP addresses, a second axis of the 3D graph corresponds to a range of the second identifier set of bits of the IP addresses, and a third axis of the 3D graph corresponds to a range of the third identifier set of bits of the IP addresses.

16. The computer-implemented method according to claim 11, further comprising:
generating a plurality of IP address block graphs representing different IP address ranges of the entities; and
combining the IP address block graphs to produce an aggregated IP address block graph representing a logical view of the entities.

17. A non-transitory computer readable medium on which is stored machine readable instructions that when executed by a processor, cause the processor to:
access network activity data of a plurality of entities, wherein each of the entities is assigned a distinct internet protocol (IP) address, each IP address including a prefix set of bits, a first identifier set of bits, and a second identifier set of bits;
identify activity information of the entities collected over a period of time from the accessed network activity data;
convert amounts of the activity information of the entities into visual representations of the activity information of the entities;
generate an IP address block graph for the entities by using the IP addresses assigned to the entities to define locations of the entities on the IP address block graph;
overlaying the visual representations of the activity information of the entities over the locations of the entities on the IP address block graph; and
cause the IP address block graph with the overlaid visual representations of the activity information of the entities to be displayed on a display device.

18. The non-transitory computer readable medium according to claim 17, wherein the instructions are further to cause the processor to:
analyze the visual representations of the activity information of the entities;
determine, from the analyzed visual representations, that an event of interest has occurred; and
based on the determination that the event of interest has occurred, output an alert.

19. The non-transitory computer readable medium according to claim 17, wherein the instructions are further to cause the processor to:
summarize the network activity data based on at least one attribute;
identify the activity information of the entities from the summarized network activity data; and generate the visual representations as representations of the summarized network activity data.

20. The non-transitory computer readable medium according to claim 17, wherein the IP address block graph comprises a three dimensional (3D) graph and wherein the instructions are further to cause the processor to:
   additionally overlay the visual representations of the activity information of the entities over the locations of the entities according to a third identifier set of bits of the IP addresses to which the visual representations correspond, wherein a first axis of the 3D graph corresponds to a range of the first identifier set of bits of the IP addresses, a second axis of the 3D graph corresponds to a range of the second identifier set of bits of the IP addresses, and a third axis of the 3D graph corresponds to a range of the third identifier set of bits of the IP addresses.

* * * * *